US005159472A

United States Patent [19]

Miyabayashi

[11] Patent Number: 5,159,472

[45] **Date of Patent: * Oct. 27, 1992**

[54] IMAGE FORMING APPARATUS USING SOLID IMAGE-PICKUP ELEMENT

[75] Inventor: Takeshi Miyabayashi, Nagoya, Japan

[73] Assignee: Brother Kogyo Kabushiki Kaisha, Aichi, Japan

[ * ] Notice: The portion of the term of this patent subsequent to Jul. 30, 2008 has been disclaimed.

[21] Appl. No.: 533,331

[22] Filed: Jun. 5, 1990

[30] Foreign Application Priority Data

Jun. 6, 1989 [JP] Japan ................................ 1-143354
Jun. 19, 1989 [JP] Japan ................................ 1-158016
Jun. 19, 1989 [JP] Japan ................................ 1-158017

[51] Int. Cl.[5] .................... H04N 5/335; H04N 1/028; G03G 5/047; G03G 15/04; G03G 9/093

[52] U.S. Cl. ................................ 358/482; 346/153.1; 355/211; 358/213.11

[58] Field of Search .................. 358/300, 482, 213.11; 346/153.1, 160; 357/30 H, 30 K, 30 Q, 30 R; 355/202, 211, 219, 220

[56] References Cited

U.S. PATENT DOCUMENTS 5,036,396 7/1991 Miyabayashi .................. 358/213.11

*Primary Examiner*—George H. Miller, Jr.
*Assistant Examiner*—Scott A. Rogers
*Attorney, Agent, or Firm*—Oliff & Berridge

[57] ABSTRACT

An image forming apparatus comprising a solid image-pickup device having a number of photoelectric conversion elements each for converting an image light incident thereto into an electrical signal representing an amount of the incident image light, and a number of storage cell elements each for storing charges in accordance with the electrical signal for forming and storing an optical latent image corresponding to the image light. The photoelectric conversion elements and the storage cell elements are arranged in a matrix form and each of the photoelectric conversion elements is integrally laminated on each of the storage cell elements, and a toner spray gun for supplying toners to developing surfaces of the storage cell elements to develop the optical latent image.

9 Claims, 10 Drawing Sheets

IMAGE FORMING APPARATUS USING SOLID IMAGE-PICKUP ELEMENT

BACKGROUND OF THE INVENTION

This invention relates to an image forming apparatus, and more particularly to an image forming apparatus suitable for recording on a recording medium an optical information inputted through a solid image-pickup element.

An electrophotographic copying machine has been conventionally well known as an image forming apparatus for forming an image on a recording medium. In such a copying machine are mainly adopted one of two copying processes, one of which is a process for collectively exposing a photosensitive layer on a photosensitive drum to an original image light to form an optical latent image on the layer, and the other of which is a process for beforehand storing an original image as a digital bit map information in a memory and then exposing a photosensitive layer on a photosensitive drum while scanning the layer with a laser beam in accordance with the bit map information, thereby forming an optical latent image on the layer.

In both of the above two processes, toners are directly coated on the photosensitive layer serving as a latent image forming surface to develope the latent image, that is, the latent image forming surface for forming a latent image thereon is identical to a developing surface for developing the latent image thereon. In general, the photosensitive layer comprises a photosensitive material formed of a semiconductive material, and thus is liable to be damaged. Accordingly, the direct coating of the toners on the photosensitive layer frequently causes the surface of the photosensitive layer to be deteriorated during a developing process for supplying toners or ink to the photosensitive layer and a cleaning process of cleaning the photosensitive layer after the developing process.

Particularly, in the latter process inlcuding a conventing operation of the latent image into the bit map information, an original is scanned with light and an image light reflected from the original is inputted by a solid image-pickup element such as a CCD (charge-coupled device) or the like to obtain an electrical image signal corresponding to the image light, which is once stored in a bit map information in a memory. A laser beam is modulated in accordance with the image signal and then is irradiated to the photosensitive layer on the photosensitive drum, that is, the surface of the photosensitive layer is scanned with the modulated laser beam to form an optical latent image on the photosensitive layer. Thereafter, the photosensitive layer having the optical latent image thereon is coated with toners to obtain a toner image, which is transferred to a recording medium (sheet), and finally a visible image corresponding to the original image is recorded on the recording medium. In this process, however, an exposing process for scanning the photosensitive layer with light is further required separately from a process for scanning the original with light, and therefore more time is required for recording a visible image on a recording medium. In addition, at least two exposure systems each for individually scanning each of the original and the photosensitive layer with light must be equipped with the apparatus. Accordingly, the apparatus itself is complicate in construction and a cost thereof is increased.

SUMMARY OF THE INVENTION

An object of this invention is to provide an image forming apparatus in which surfaces for forming and developing a latent image are separately provided, so that the apparatus has high resistance to a damage due to attachment of toners or ink.

Another object of this invention is to provide an image forming apparatus capable of forming and developing an optical latent image using only one exposure system with high quality and high resolution.

In order to attain the above objects, an image forming apparatus according to this invention in which an optical latent image is formed with a light image and then the optical latent image is developed with toners to thereby form a visible image corresponding to the latent image, comprises a solid image-pickup device having a number of photoelectric conversion elements each having a light receiving surface for converting an image light incident thereto into an electrical signal representing an amount of the incident image light, and a number of storage cell elements each having a developing surface for storing charages in accordance with the electrical signal, to thereby form and store an optical latent image corresponding to the image light, the photoelectric conversion elements and the storage cell elements being arranged in a matrix form and each of the photoelectric conversion elements being laminated on each of the storage cell elements, and a developing unit for supplying developer agent the developing surfaces of the storage cell elements to develop the optical latent image.

Each of the photoelectric conversion elements comprises a p-i-n photodetector for producing an amount of charges corresponding to an amount of light incident thereto, or a photoswitch functioning as a resistance variable in accordance with an amount of light incident thereto, and each of the strage cell elements comprises a positive electrode, a solid electrolyte and a negative electrode.

In the image forming apparatus thus constructed, upon incidence of an image light to the solid image-pickup device, the storage cell elements are charged therein or discharged therefrom by an amount of charges corresponding to an amount of the incident image light to form and store an optical latent image corresponding to the incident image light in the storage cell elements. After forming the optical latent image in the storage cell elements, developer agent such as toner (carbon black) is supplied to a developing surface on which the optical latent image is formed with charges to form a toner image on the developing surface. Further, the toner image is transferred to a sheet to form a visible image on the sheet. In this case, the optical latent image formed in the storage cell elements may be beforehand read out as a bit map information and memorized in a memory, and then the optical latent image may be reproduced in the storage cell elements on the basis of the bit map information.

DETAILED DESCRIPTION OF THE INVENTION

The preferred embodiments of this invention will be described hereunder with reference to the accompanying drawings.

Figure 1:
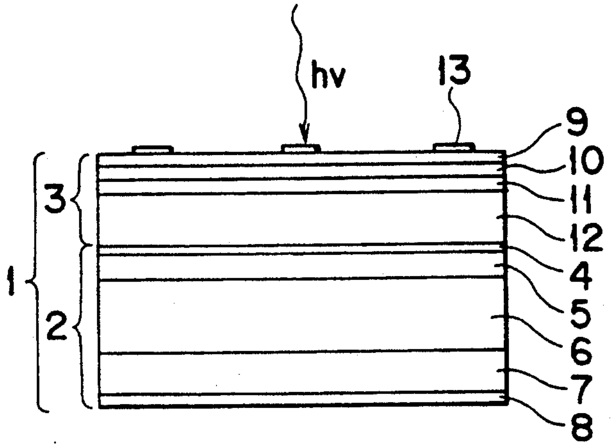
FIG. 1 shows a first embodiment of a solid image-pickup element of this invention.

FIG. 1 is a cross-sectional view of a first embodiment of a solid image-pickup element used in an image forming apparatus according to this invention.

As shown in FIG. 1, the solid image-pickup element 1 comprises a photoelectric conversion element 3 having a light receiving surface for converting an incident light image into an electrical signal, and a sheet type of storage cell element 2 for storing the electrical signal as charges, which is provided on the opposite surface to the light receiving surface of the photoelectric conversion element. In this embodiment, the photoelectric conversion element 3 is provided on a negative electrode collector 4 (as described hereunder) of the storage cell element 2, however, it may be provided on a positive electrode collector 8 (as described hereunder) which is positioned the opposite side of the storage cell element 2 to the negative electrode collector 4.

The storage cell element 2 comprises a negative electrode collector 4 formed of Ni or the like, a negative electrode 5 formed of LiBr, Li-Al alloy or the like, a solid electrolyte 6 formed of LiBr-$Li_8P_4O$ or the like, a positive electrode 7 formed of $V_2O_5$, $V_6O_{13}$ or the like, and a positive electrode collector 8 formed of Ni or the like. On the other hand, the photoelectric conversion element 3 comprises a surface electrode 13 formed of Al or the like, an anti-reflection layer 9 formed of $SiO_2$ or the like, a p-type silicon layer 10, an i-type silicon layer 11 and an n-type silicon layer 12, these elements being laminated in this order.

Figure 3:
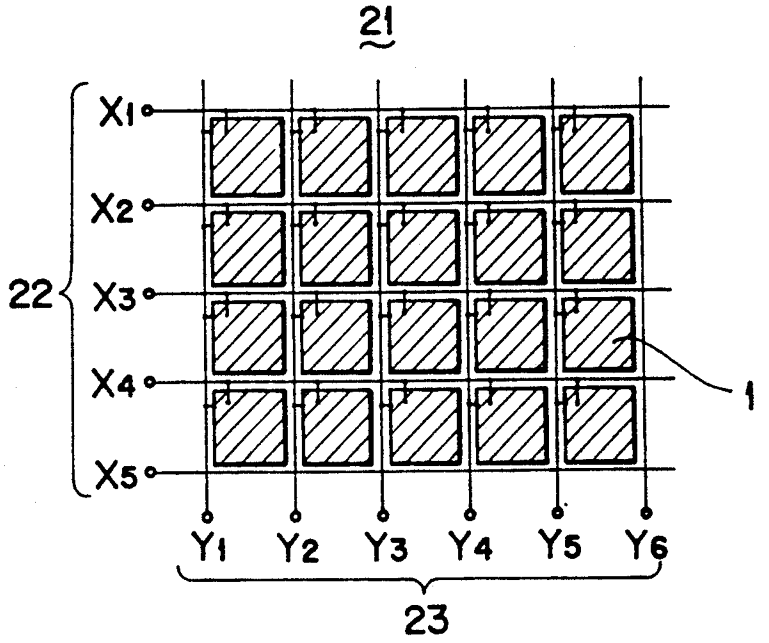
FIG. 3 shows a matrix arrangement of a number of solid image-pickup elements as shown in FIGS. 1 and 2, each of serves as a picture element.

The solid image-pickup device according to this invention has a number of solid image-pickup elements as described above, which are arranged vertically and horizontally in a matrix form as shown in FIG. 3. In this solid image-pickup device, the light receiving surface of each photoelectric conversion element 3 serves as a picture element. Upon incidence of an image light (h $\nu$) on each photoelectric conversion element serving as a picture element, an electric energy (charge) corresponding to an amount of the light incident to each photoelectric conversion element 3 is produced therein, so that a charge distribution corresponding to the incident image light occurs in a photoelectric transducer constituting all of the photoelectric conversion elements. The charge distribution thus formed corresponds to an optical latent image. The charges produced in each photoelectric conversion element is stored in the corresponding storage cell element 2 which is contacted to the photoelectric conversion element 3 through the negative electrode collector 4, to thereby storing the optical latent image on the storage cell element 2. In this case, the surface electrodes 13 are provided so as to be arranged in a matrix form on the photoelectric conversion elements.

Firstly, an operation of the solid image-pickup element according to this invention will be described below.

Figure 2:
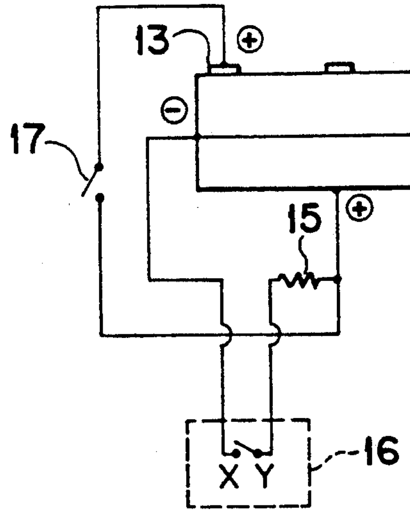
FIG. 2 is a schematic view for showing an operation of the solid image-pickup element as shown in FIG. 1.

FIG. 2 is an explanatory diagram for explaining charging and discharging processes for the storage cell element 2 using a charging circuit and a discharging circuit after a light image is supplied to the photoelectric conversion element 3. Each surface electrode 13 is connected through a switch 17 serving as the charging circuit to the positive electrode collector 8 of the sheet type of storage cell element 2, and the negative electrode collector 4 is connected through a switch 16 and a resistance 15 serving as the discharging circuit to the positive electrode collector 8.

The switch 17 and the switch 16 are kept at ON- and OFF-states, respectively, for a period When the light image is supplied to the photoelectric conversion elements 3 to store charges whose amount corresponds to an amount of incident light in each storage cell element 2. After the charging process as described above, the switch 17 is switched to an OFF-state to hold the charges in the storage cell element 2. On the other hand, when the charges stored in the storage cell element 2 are discharged therefrom to read out or erase an information represented by the charges stored in the storage cell element 2, the switch 17 is kept at the OFF-state and the switch 16 is switched to the ON-state.

FIG. 3 is a top view of the solid image-pickup device in which plural solid image-pickup elements as shown in FIGS. 1 and 2 are connectedly arranged in a matrix form.

As shown in FIG. 3, two kinds of outgoing electrodes X and Y (in FIG. 3, lines $X_1$ to $X_5$ and $Y_1$ to $Y_6$) are connected to the negative electrode collectors and the positive electrode collectors, respectively, of all of the storage cell elements used in the solid image-pickup device. These outgoing electrodes X and Y are connected to each other through the switch 16 as shown in FIG. 2. In this embodiment, a shift register or other well-known elements, which are driven with a matrix scanning operation, may be used as the switch 16.

As described above, the solid image-pickup device of this invention converts an incident original image light into a electrical image in the photoelectric conversion elements and then stores the electrical image as charges in the storage cell elements which are positioned at the opposite side to the photoelectric conversion elements. That is, the optical latent image is firstly produced in the photoelectric conversion elements, and is finally stored in the storage cell elements. Insofar as the charges stored in the storage cell elements are not discharged, the optical latent image corresponding to the incident image light is kept in the storage cell elements.

Figure 4:
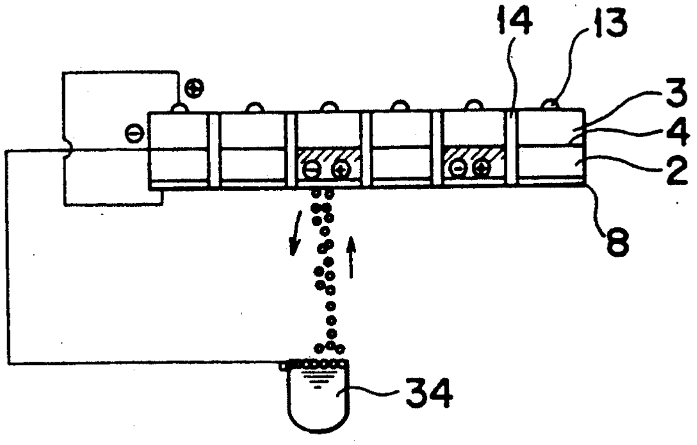
FIG. 4 shows an embodiment of the image forming apparatus according to this invention using the solid image-pickup device as shown in FIG. 3.

FIG. 4 shows an embodiment of the image forming apparatus using the solid image-pickup device as shown in FIGS. 1 to 3, in which the latent image stored in the storage cell elements is developed with toners to obtain a visible image.

In this apparatus, the solid image-pickup elements are separated from one another through separators 14 formed of an insulator such as polyimide or the like. As shown in FIG. 4, the separators 14 are provided between the neighboring solid image-pickup elements in such a manner as to vertically penetrate through the solid image-pickup device as shown in FIG. 4. Further, the apparatus is provided with a spray gun 34 for spraying toners to the positive electrode collectors of the solid image-pickup elements to develop the latent image stored in the storage cell elements.

A developing process of the latent image is performed by means of an electrophoresis phenomenon and an electrodeposition effect of the toners during a discharging operation of the storage cell elements, or by means of electrolytic oxidation of the toners at the positive electrode collectors 8 through the discharging phenomenon of the storage cell elements 2. In the former method, an electrolyte solution is filled between the toner spray gun and the storage cell elements, and the toner spray gun is disposed so as to confront the storage cell elements through the electrolyte solution. In latter method, microcapsules 42 encapsulating toners 41 therein as shown in FIGS. 5 and 6 are utilized for attaching the toners to the charged storage cell elements.

Figure 5:
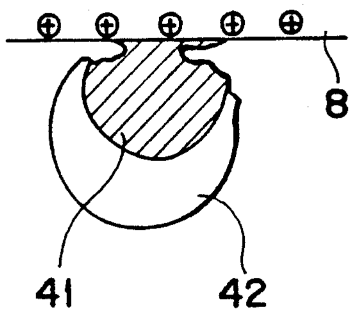
FIG. 5 shows a microcapsule encapsulating toner used in the image forming apparatus according to this invention.
Figure 6:
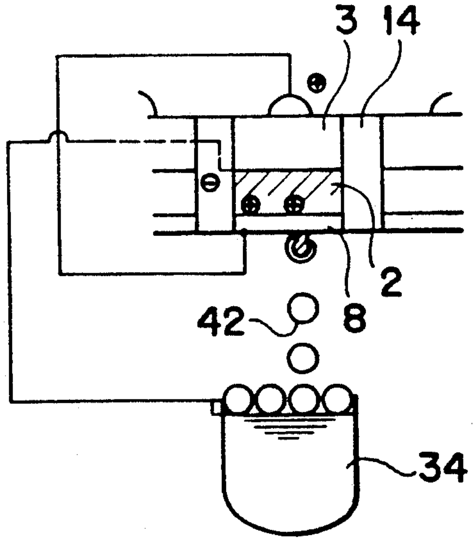
FIG. 6 is a schematic view for showing a process for attaching the toners encapsulated in the microcapsules to the storage cell elements by means of electrolytic oxidation.

The microcapsule 42 as shown in FIG. 5 is formed of paraffin film, cellulose film, stearic acid film, formvar film or the like. In a developing process, the microcapsules 42 are supplied from the spray gun 34 to the positive electrode collector 8 of the storage cell element 2 through the discharging operation thereof and ruptured thereat through the electrolytic oxidation as shown in FIG. 5, so that the toners 41 encapsulated in the microcapsules are issued therefrom and attached to the positive electrode collector 8. In this case, the toners are preferably negatively charged.

Figure 7:
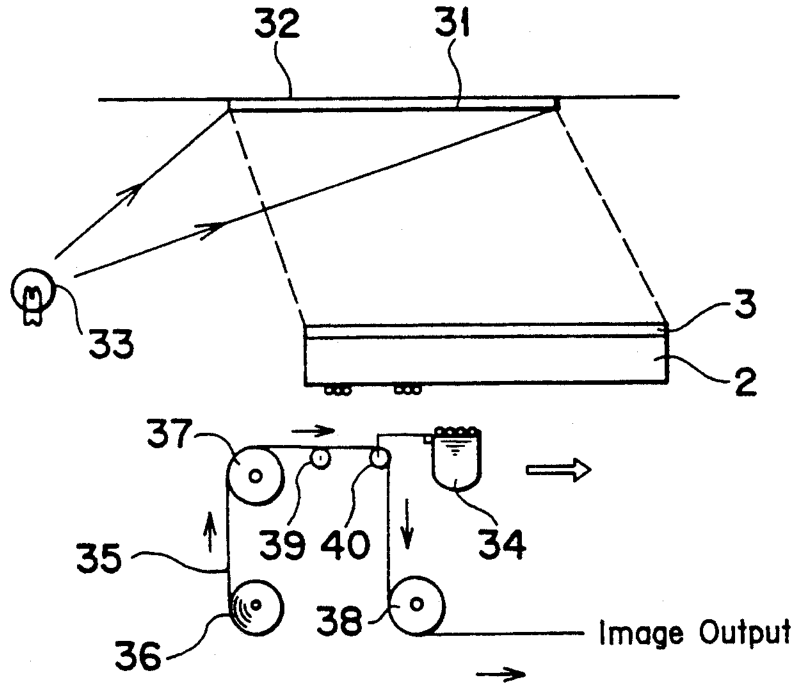
FIG. 7 is a schematic view for a toner supply process in the image forming apparatus.
Figure 8:
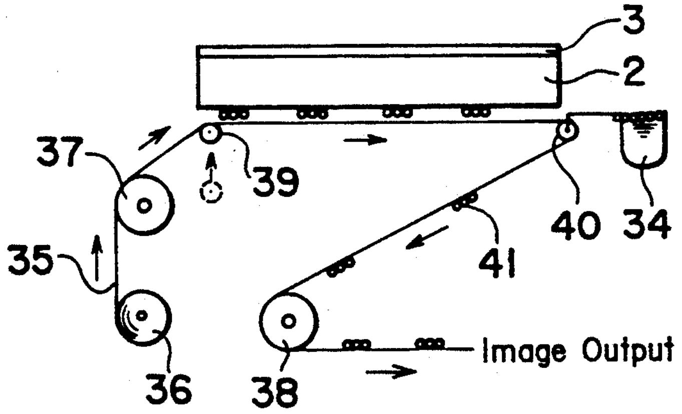
FIG. 8 is a schematic view for a transfer process for transferring a toner image to a sheet to form a visible image on the sheet.

FIGS. 7 and 8 show an embodiment of the image forming apparatus according to this invention in which the solid image-pickup device as shown in FIGS. 1 to 4 is used, in which FIG. 7 is a schematic view for showing exposure and developing processes in the image forming apparatus, and FIG. 8 is a schematic view for showing a transfer operation of the toners to a sheet.

The image forming apparatus includes an original support stand 32 for mounting an original 31 thereon, a light source 33 for exposing the original to light, a solid image-pickup device comprising photoelectric conversion elements 3 arranged in a matrix form in which an optical latent image is formed upon incidence of a light image reflected from the original 31, and storage cell elements formed integrally with the photoelectric conversion elements for storing charges which are produced in the photoelectric conversion elements 3, a toner spray gun 34 for supplying the toners to the positive electrode collectors of the storage cell elements 2, a sheet supply roll 36 for supplying a transfer sheet to the solid image-pickup device, fixing rollers 37 and 38, and movable rollers 39 and 40.

In this image forming apparatus, the optical latent image is formed in the photoelectric conversion elements 3 upon incidence of the original image light thereto and then stored in the storage cell elements 2 in the manner as described above. Thereafter, the toners are supplied to the storage cell elements 2 by the toner spray gun 34 to develop the optical latent image and form a toner image on the storage cell elements 2. A transfer sheet is contacted to the positive electrode collectors 8 by upwardly moving the movable roller 39, thereby transferring the toner image to the sheet. In this transfer process, a conventional electrophotographic process may be adopted. That is, a transfer sheet is beforehand charged by charging means such as a corotron (not shown) so that the toner image is transferred to the transfer sheet.

In the above embodiment, each of the photoelectric conversion elements of the solid image-pickup device comprises the P-type , I-type and N-type silicon laminated layers. However, the mateial and construction of the photoelectric conversion element of this invention is not limited to those of the above-described embodiment, and any modification may be made insofar as it does not depart from the subject matter of this invention.

In the above embodiment, the latent image stored in the storage cell element is developed with toners to form a visible image corresponding to the original image without converting the latent information into a bit map information, that is, the latent image is developed immediately after it is formed in the photoelectric conversion element and stored in the storage cell element. Therefore, reduction, enlargement, correction and other modification operations can not be performed for the latent image stored in the storage cell element. The following embodiment can obtain a visible image after making various editorial modifications such as reduction, enlargement, correction and so on for the latent image stored in the storage cell element.

Figure 9:
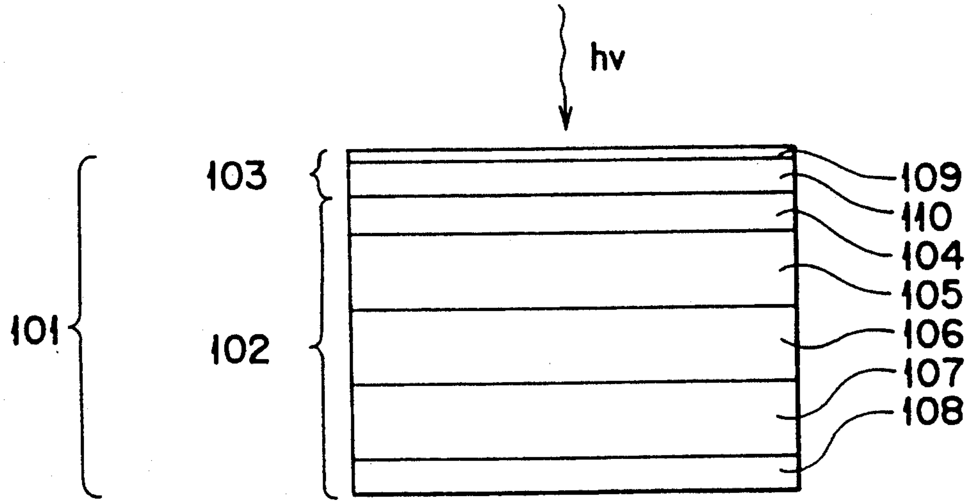
FIG. 9 shows a second embodiment of the solid image-pickup element of this invention.

FIG. 9 shows a second embodiment of the solid image-pickup element of this invention. The solid image-pickup element 101 as shown in FIG. 9 has a substantially similar construction to that of FIG. 1, and the detailed description of the same elements as those of FIG. 1 are eliminated.

Similary in the first embodiment of the solid image-pickup element, the solid image-pickup element as shown in FIG. 9 comprises a sheet type storage cell element 102 and a photoelectric conversion element 103 serving as a discharging switch provided on the storage cell element 102. The storage cell element 102 of this embodiment comprises a positive electrode collector 104 formed of Ni or the like, a positive electrode formed of $V_6O_{13}$, $V_2O_5$ or the like, an electrolyte formed of polymer electrolyte comprising a polyethylene derivative containing $LiC_4$, a negative electrode 107 formed of Li-Al alloy and a negative electrode collector 108 formed of Ni or the like. On the other hand, the photoelectric conversion element 103 comprises a transparent electrode 109 formed of ITO (Indium Tin Oxide) film or the like, a photoconductive layer 110 formed of $TiO_2$, ZnO, an organic photoconductive material or the like. In this embodiment, unlike the first embodiment as shown in FIG. 1, the photoelectric conversion element 103 is provided on the positive electrode collector 104, however, it may be provided on the negative electrode collector 108 like the solid image-pickup element as shown in FIG. 1.

Figure 10:
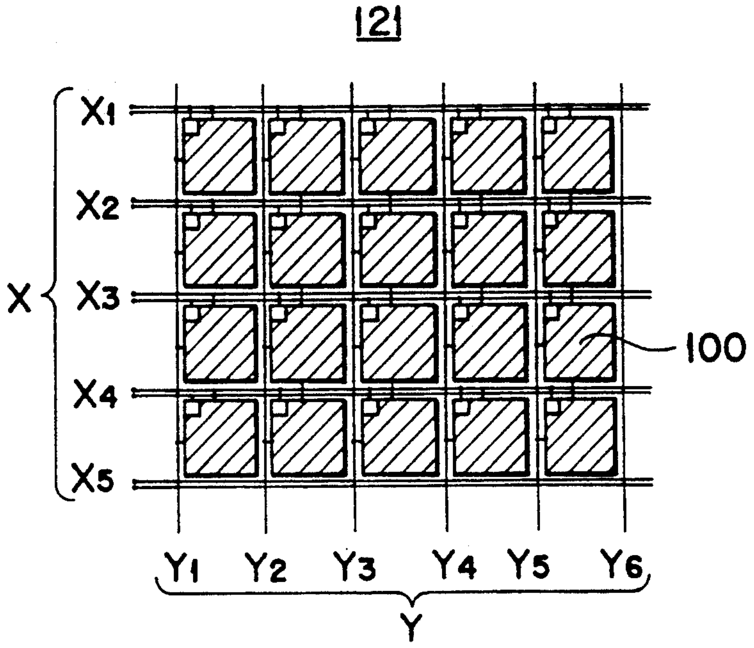
FIG. 10 shows a matrix arrangement of a number of solid image-pickup elements as shown in FIG. 9, each of which serves as a picture element.
Figure 11:
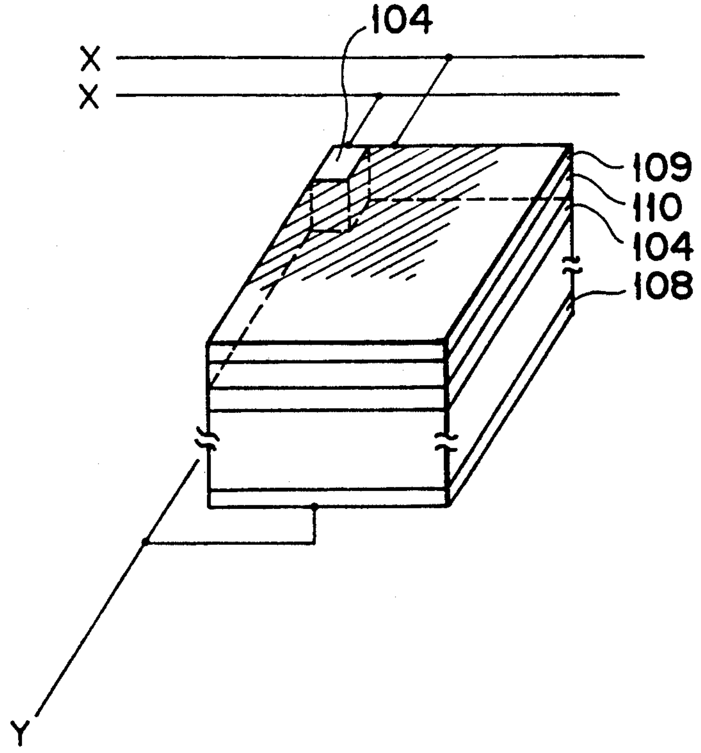
FIG. 11 is a schematic view of outgoing electrodes for electrically reading out or writing an optical latent image, which are arranged in the solid image-pickup device vertically and horizontally.

FIG. 10 is a top view of the solid image-pickup device 121 using a number of solid image-pickup elements arranged in a matrix form as shown in FIG. 9 and outgoing electrodes X and Y, which are arranged in a matrix form in the solid image-pickup device, and FIG. 11 is a schematic view for showing the arrangement of the outgoing electrodes provided for the solid image-pickup elements.

The outgoing electrodes X comprises two groups of outgoing electrodes, the outgoing electrodes of one group being connected to the transparent electrodes 109 of the photoelectric conversion elements 103 and those of the other group being connected to the positive electrode collectors 104 of the storage cell elements 102, and the outgoing electrodes Y are connected to the negative electrode collectors of the storage cell elements 108. The outgoing electrodes X and Y have a wiring arrangement in which the outgoing electrodes X and Y are provided between the neighboring solid image-pickup elements horizontally and vertically (in the X-direction and Y-direction), respectively. The transparent electrodes 109 of the photoelectric conversion elements and the positive and negative electrode collectors 104 and 108 of the storage cell elements are connected through the outgoing electrodes X and Y to a controller 130 ( as described hereinafter) for reading out the latent image stored in the storage cell elements and writing the latent image in the storage cell elements in accorance with input information. The controller 130 is used for charging and discharging the storage cell element 102.

Figure 12:
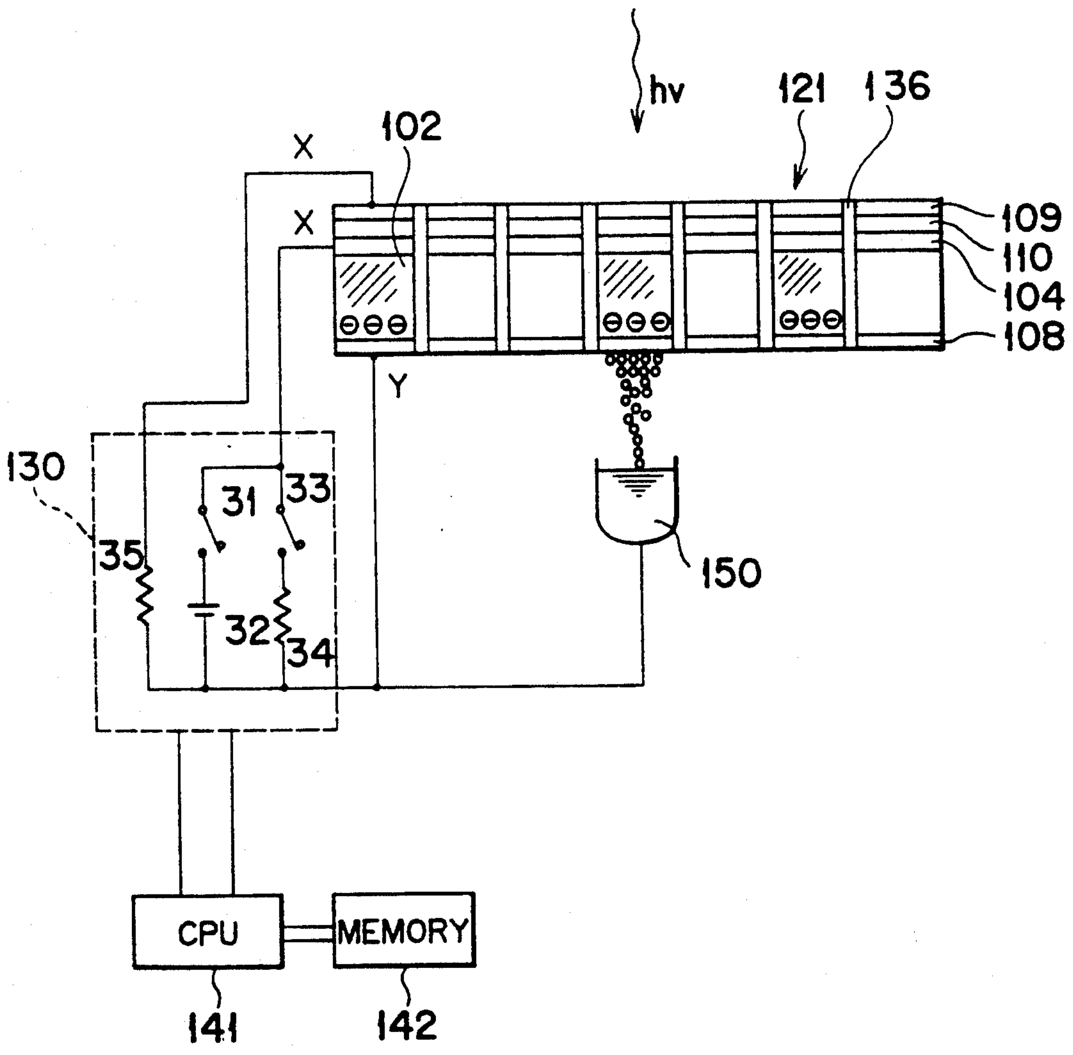
FIG. 12 shows another embodiment of the image forming apparatus according to this invention using the solid image-pickup device having an image reading function as shown in FIGS. 9 to 11.

FIG. 12 shows the image forming apparatus according to this invention in which the solid image-pickup device as shown in FIGS. 9 to 11 are used.

In this apparatus, a power source 132 and a switch 131 serving as a charging circuit are connected in series between the positive electrode collectors 104 and the negative electrode collectors 108 of the storage cell elements 102, and a resistance 134 and a switch 133 serving as a read-out circuit for reading out a charge amount stored in each storage cell element 102 are connected in series between the positive electrode collectors 104 and the negative electrode collectors 108. Further, a discharging resistance 135 serving as a discharging circuit during a light-exposure process is connected between the transparent electrodes 109 of the photoelectric conversion elements 103 and the negative electrode collectors 108 of the storage cell elements 102.

The controller 130 includes the switches 31 and 33 and the other elements as described above, and is controlled by a CPU 141. The resistance (load) 134 is used to detect the charges stored in each storage cell element 102 (read out an image information stored in the storage cell element 102 as a bit map information) during a discharging operation of the storage cell element 102. During the discharging operation, a discharging current flowing through the resistance 134 is detected by the CPU 141 and the result is stored in a memory 142 as a bit map information.

In addition to the above elements, a toner spray gun 150 is further provided so as to confront the negative electrode collectors 108 of the storage cell elements 102, and one end of the spray gun 150 is electrically connected to a contact point of the power source 132 and the resistance 134.

The switches 131 and 133 are designed so that a matrix scanning operation can be carried out for the outgoing electrodes X extending in the X-direction and the outgoing electrodes Y extending in the Y-direction. A shift register may be used as these switches.

An operation of the image forming apparatus as shown in FIG. 12 will be described hereunder.

At a first stage, the switch 131 of the controller 130 is kept at an ON-state for a predetermined period to store a predetermined amount of electric energy (charges) in each sheet type storage cell element 102 through the power source 132 which is preferably a constant-current source. At a next stage, light h $\nu$ is irradiated through the transparent electrode 109 to the photoconductive layer 110 to switch the photoelectric conversion elements serving as the discharging switch 103 to ON-state, so that the charged stored in the storage cell elements 102 are discharged therefrom through the transparent electrode 109 and the resistance 135 in accordance with an irradiated light amount and a irradiating time of the light. As a result, a charging distribution corresponding to an incident light image is formed as an optical latent image in the storage cell element 102.

At a next stage, the switch 133 is switched to ON-state to allow a discharging current to flow from the storage cell elements 102 through the resistance 134. The discharging current flowing through the resistance 134 is measured to detect residual charges which have been stored in each storage cell element 102, that is, the optical latent image stored in the storage cell elements 102 is read out as a bit map information through the CPU 141, and then the bit map information is stored in the memory 142. Through the above stages, the latent image stored in the storage cell elements 102 is converted to a bit map information and stored in the memory 142.

The bit map information stored in the memory 142 is read out through the CPU 141 to subject the bit map information to an editorial operation such as reduction, enlargement, correction or other operations, and then the controller 130 is driven to store charges in the storage cell elements 102 in accordance with the bit map information through the power source 132, thereby writing the bit map information in the solid image-pickup device 121, that is, by forming a modified latent image in the storage cell elements 102. At this time, the switch 133 is switched to ON-state and the toner spray gun 150 is driven to supply the toners to the latent image stored in the storage cell elements 102. The supplied toners are deposited on the storage cell elements to form a visible image corresponding to the latent image.

Further, if an intensity distribution of signals (charge distribution stored in the storage cell elements ) read out of the storage cell elements 102 is converted to an two-dimensional image, and inputted to an external means (not shown) such as a display unit, an incident light image (h $\nu$) to the solid image-pickup device can be traced.

Figure 13:
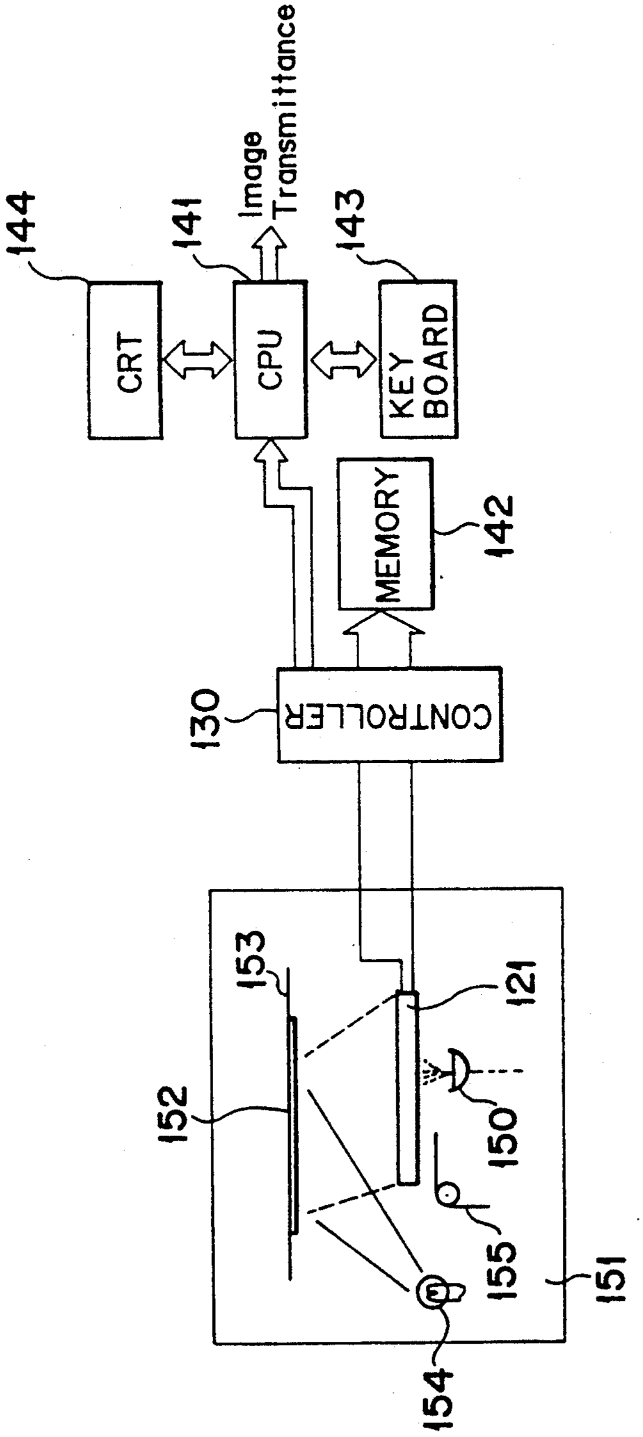
FIG. 13 is a schematic diagram for the image forming system using the solid image-pickup device as shown in FIG. 12.

FIG. 13 shows an image forming system in which the image forming apparatus as shown in FIG. 12 is further provided with an image reading function.

The image forming system 151 as shown in FIG. 13 includes an original support stand 153 for mounting an original 152 thereon and an exposure lamp 154. A transfer sheet 155 may be supplied to a developing surface of the solid image-pickup device 121 to transfer a toner image on the storage cell elements to the sheet if occasion demands.

The original 152 is exposed to light by the exposure lamp 154, an image light reflected from the original 154 is incident to the solid image-pickup device 121. At this time, the controller 130 is driven in accordance with an instruction from the CPU 141 to form a latent image in the storage cell elements . Thereafter, by manually operating a key board 143, the CPU 141 controls the memory 142 to store a bit map information corresponding to the optical latent image stored in the storage cell elements , and controls a CRT 144 to display the optical latent image or transmits the information to an external device.

As described above, in addition to the separation arrangement of the latent image forming surface and the developing surface and the single exposure system for exposure and developing processes as described in the first embodiment, this embodiment can perform an editorial operation of the latent image stored in the storage cell elements by beforehand converting the latent image to a corresponding bit map information and then storing a modified latent image in the storage cell elements again. Therefore, an visible image can be obtained with high equality and high degree of freedom in editorial operation.

A process for producing the solid image-pickup device according to this invention will be described hereunder.

Figure 14:
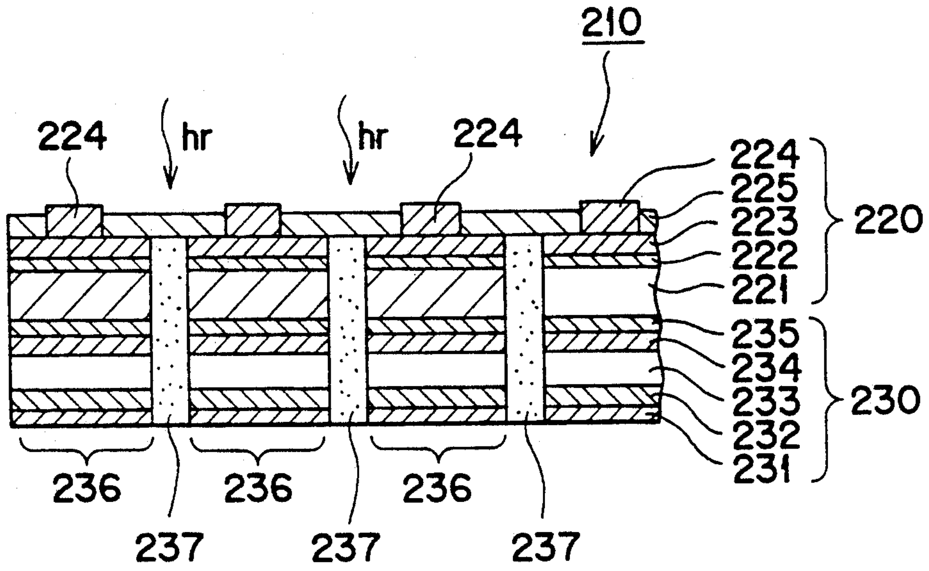
FIG. 14 shows a third embodiment of the solid image-pickup device of this invention.

FIG. 14 is a cross-sectional view of an embodiment of the solid image-pickup device according to this invention, and FIGS. 15(A) to 15(H) and FIGS. 16(A) to (C) are cross-sectional views and top views for showing steps of the process for producing the solid image-pickup device as shown in FIG. 14.

The solid image-pickup device 210 as show in FIG. 14 is substantially similar to that of the first and second embodiments, and comprises a number of photoelectric conversion elements 220 each having a light receiving surface for converting an incident light image into an electrical signal representing the image, and sheet type of storage cell elements 230 for storing the electrical signal as charges, which are provided on the opposite surfaces to the light receiving surfaces of the photoelectric conversion elements 220.

A photoelectric conversion unit comprising a nmber of photoelectric conversion elements 220 basically comprises a PIN junction type semiconductor, and includes a P-type silicon layer 221, an I-type silicon layer 222 and an N-type silicon layer 223 which are laminated in this order, surface electrodes 224 of Al provided in a matrix form on the N-type silicon layer 223 and antireflection coatings 225 $SiO_2$ provided between neighboring surface electrodes 224. On the other hand, a storage cell unit comprising a number of storage cell elements 230 includes a negative electrode collector 231 of Ni, a negative electrode 232 of Li or Li-Al alloy formed on the negative electrode collector 231, a solid electrolyte 233 of $LiBrP_4O$ or $LiBr\text{-}Li_8P_4O$, a composite type positive electrode 234 of $V_2O_5$, $V_6O_{13}$ or the like, and a positive electrode collector 235 of Ni or the like.

The P-type silicon layer 221 of each photoelectric conversion element 220 and the positive electrode collector 235 of each storage cell element are connected to each other and serve as a junction surface. In this case, a region including one surface electrode 224 serves as a picture element and an insulating separator 237 of polyimide resin are provided between the neighboring picture elements so as to vertically penetrate through the solid image-pickup device as show in FIG. 14. The picture elements are separated from one another by the separators 237.

The process for producing the solid image-pickup device as shown in FIG. 14 will be described in detail with reference to FIGS. 15(A) to 15(H) and FIGS. 16(A) to 16(C).

Figure 15A:
FIGS. 15(A) to 15(H) are cross-sectional views of the solid image-pickup device for showing a process for producing the solid image-pickup device as shown in FIG. 14.
Figure 15B:
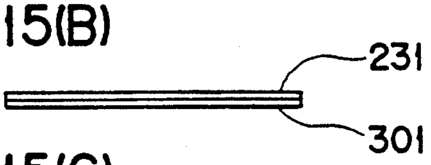
Figure 15C:
Figure 15D:
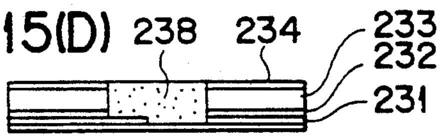
Figure 15E:
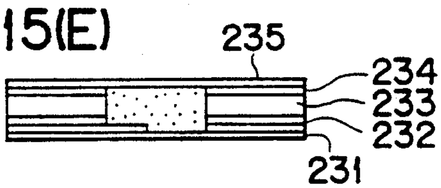
Figure 15F:
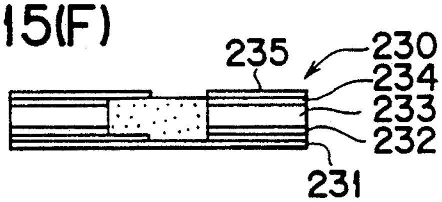

At a first stage, a negative electrode collector 231 is formed of Ni on a sheet type plastic substrate 301 by a thin film forming technique such as vacuum deposition, sputtering, ion plating, chemical vacuum deposition (CVD), metallic coating or other methods (as shown in FIGS. 15(A) and 15(B)). At a second stage, the thus formed negative electrode collector 231 is subjected to a pattern etching process to form the base of each storage cell element 236 in a matrix form (as shown in FIG. 15(C)), and the whole surface thereof is coated with polyimide resin used as the separator 237. Thereafter, the polyimide resin coated on the base of each storage cell element 230 is eliminated therefrom by a photolithography technique and a mask portion 238 is thickly provided between the neighboring bases. Further, the negative electrode 232 of Li, the solid electrolyte 233 and the positive electrode of $V^6O^{13}$ are laminated in this order on each base of the storage cell elements 230 by means of the thin film forming technique and the pattern etching technique (as shown in FIG. 15(D)), and then the positive electrode collector 235 of Ni is further formed thereon (as shown in FIG. 15(E)). The positive electrode collector 235 thus formed is subjected to the pattern etching process, thereby forming each storage cell element 230 (as shown in FIG. 15(F)).

Next, a process for forming photoelectric conversion elements 220 on the thus formed storage cell elements 230 will be described hereunder.

Figure 15G:
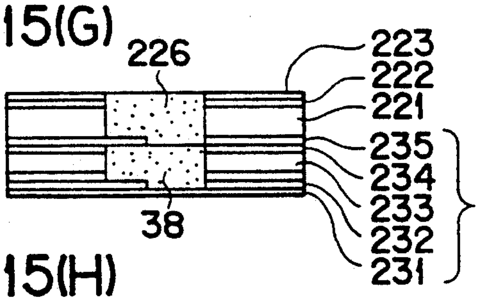
Figure 15H:
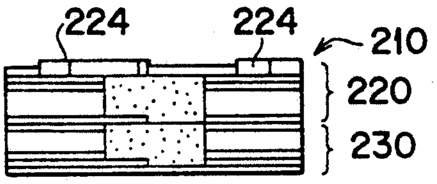
Figure 16A:
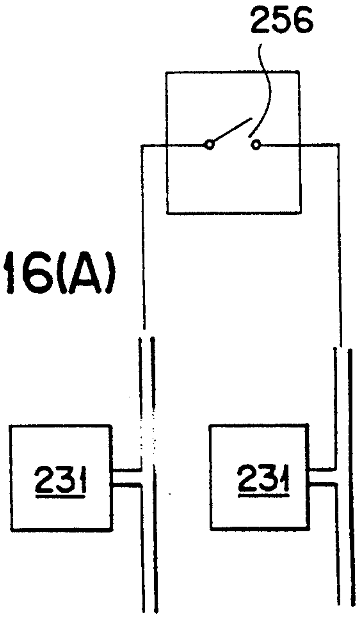
FIGS. 16(A) to (C) are top views of the solid image-pickup device as shown in FIG. 14, which correpond to FIGS. (C), (F) and (H).
Figure 16B:
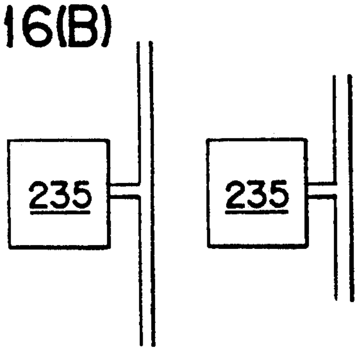
Figure 16C:
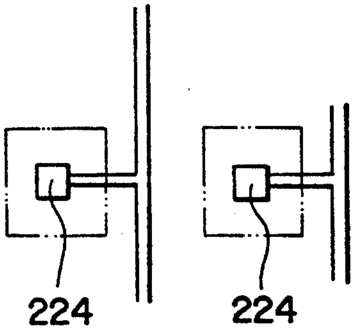

At a first stage, a P-type silicon layer 221, an I-type silicon layer 222 and an N-type silicon layer 223 are laminated in this order on the positive electrode collector 235 by means of the thin film forming technique and the pattern etching technique such that the photoelectric conversion elements 220 each serving as a picture element are sectioned in a matrix form. Thereafter, polyimide resin is provided between the neighboring picture elements to form mask portions 226 (as shown in FIG. 15(G)), and a surface electrode layer is formed on the whole surfaces of the mask portions 226 and the N-type silicon layers 223. The surface electrode layer is subjected to the pattern etching process to form surface electrodes 224 in a matrix on the photoelectric conversion elements, each of which is assigned to each picture element, and an antireflection layer 225 is coated between the neighboring surface electrodes (as shown in FIG. 15(H)) to complete the procduction of the solid image-pickup device. FIGS. 16(A) to 16(C) are top views of the solid image-pickup device, which correspond to FIGS. 15(C), (F) and (H).

In the solid image-pickup device thus formed, a number of storage cell elements 230 and photoelectric conversion elements 220 are vertically and horizontally arranged in a matrix, and the surface electrodes 224 provided on the photoelectric conversion elements 220 are electrically connected to the negative electrode collectors 231 of the storage cell elements 230 through pattern wirings, that is, both of the storage cell elements and the photoelectric conversion elements are connected in parallel.

According to the image forming apparatus as described above, an optical latent image forming surface and a developing surface are independently and separetely provided. As a result, the damage of the optical latent image can be more prevented in comparison with the conventional image forming apparatus in which the optical latent image forming surface and the developing surface are identical to each other, and durability of the photoelectric conversion element used in the apparatus can be improved. Further, the positive electrode collector serving as the developing surface may be formed of a rigid material such as Ni or the like to more improve the durability of the solid image-pickup device.

Still, each photoelectric conversion element serving as a picture element can be designed so as to be approximately 50 $\phi$m in size, so that a resolution for an image is improved up to 400 dots per inch.

Further still, a developing process is performed by means of a discharging phenomenon of the storage cell element, so that high reproduction of an image is performed in the developing process.

What is claimed is:

1. An image forming apparatus for forming an optical, latent image with a light image and developing the optical latent image with toners to thereby form a visible image corresponding to the latent image, comprising:

a solid image-pickup device having a number of photoelectric conversion elements each having a light receiving surface for converting an image light incident thereto into an electrical signal representing an amount of the incident image light, and a number of storage cell elements each having a developing surface for storing charages in accordance with the electrical signal, to thereby form and store an optical latent image corresponding to the image light, said photoelectric conversion elements and said storage cell elements being arranged in a matrix form and each of said photoelectric conversion elements being laminated on each of said storage cell elements; and a developing unit for supplying developer agent to the developing surfaces of said storage cell elements to develop the optical latent image.

2. An image forming apparatus as claimed in claim 1, wherein each of said storage cell elements comprises a positive electrode, a solid electrolyte and a negative electrode, one of said positive and negative electrodes serving as the developing surface.

3. An image forming apparatus as claimed in claim 2, wherein each of said photoelectric conversion elements comprises a p-i-n photodetector including a surface electrode, a p-type semiconductor layer, an i-type semiconductor layer and an n-type semiconductor layer laminated in this order, each of said storage cell elements storing charges produced in said p-i-n photodetector.

4. An image forming apparatus as claimed in claim 2, wherein each of said photoelectric conversion elements comprises a photoswitch having a transparent electrode and a photoconductive layer.

5. An image forming apparatus as claimed in claim 4, wherein said solid image-pickup device further comprises a charging unit for charging each of said storage cell elements at a predetermined value, said photoswitch discharing the amount of charges corresponding to the amount of the incident image light therethrough from said storage cell elements to thereby form the optical latent image with charges remaining in said storage cell elements.

6. An image forming apparatus as claimed in claim 1, further comprising a control unit for controlling charging and discharging operations of said storage cell elements to convert the electrical signal stored in said storage cell elements into a bit map information, and a memory for storing the bit map information.

7. An image forming apparatus as claimed in claim.- 1, wherein said developing unit comprises a spray gun for electrically supplying the developing agent to the developing surface of each of said storage cell elements through a discharging operation of said storage cell elements.

8. An image forming apparatus as claimed in claim 1, wherein said developing agent comprises microcapsules encapsulating toners therein, said microcapusles being ruptured by an electrolytic oxidation.

9. An image forming apparatus for forming an optical latent image with a light image and developing the optical latent image with toners to thereby form a visible image corresponding to the latent image, comprising:

a solid image-pickup device having a number of photoelectric conversion elements each having a light receiving surface for converting an image light incident thereto into an electrical signal representing an amount of the incident image light, and a number of storage cell elements each having a developing surface for storing charages in accordance with the electrical signal, to thereby form and store an optical latent image corresponding to the image light, said photoelectric conversion elements and said storage cell elements being arranged in a matrix form and each of said photoelectric conversion elements being laminated on each of said storage cell elements;

a developing unit for supplying toners to the developing surfaces of said storage cell elements to develop the optical latent image to form a toner image on said storage cell elements; and a sheet transfer unit for transferring the toner image to a sheet to form a visible image corresponding to the optical latent image on the sheet.

* * * * *